United States Patent
Reno, Sr.

(10) Patent No.: US 11,950,729 B1
(45) Date of Patent: Apr. 9, 2024

(54) FOODSTUFF GRINDING DEVICE

(71) Applicant: Timothy F. Reno, Sr., Modesto, CA (US)

(72) Inventor: Timothy F. Reno, Sr., Modesto, CA (US)

( * ) Notice: Subject to any disclaimer, the term of this patent is extended or adjusted under 35 U.S.C. 154(b) by 0 days.

(21) Appl. No.: 17/946,361

(22) Filed: Sep. 16, 2022

Related U.S. Application Data (60) Provisional application No. 63/244,771, filed on Sep. 16, 2021.

(51) Int. Cl.
| | |
|---|---|
| *A47J 42/40* | (2006.01) |
| *A47J 42/08* | (2006.01) |
| *A47J 42/10* | (2006.01) |
| *A47J 42/50* | (2006.01) |

(52) U.S. Cl.
CPC ............ *A47J 42/40* (2013.01); *A47J 42/08* (2013.01); *A47J 42/10* (2013.01); *A47J 42/50* (2013.01)

(58) Field of Classification Search
CPC .. A47J 42/08; A47J 42/10; A47J 42/40; A47J 42/50
See application file for complete search history.

(56) References Cited

U.S. PATENT DOCUMENTS

| | | | |
|---|---|---|---|
| 4,135,672 A | 1/1979 | Schlessel | |
| 5,190,228 A | 3/1993 | Ficken et al. | |
| 6,377,022 B1 | 4/2002 | Rhoads | |
| 6,663,031 B2 | 12/2003 | Henderson et al. | |
| 6,966,507 B2 | 11/2005 | Yang | |
| 9,854,944 B2 | 1/2018 | Ohta et al. | |
| 10,413,127 B1 | 9/2019 | Jana et al. | |
| 10,478,825 B2 | 11/2019 | Mroue | |
| 10,799,059 B2 | 10/2020 | Abbiati | |
| 2013/0221144 A1 * | 8/2013 | Zhang | A47J 42/08 241/169.1 |
| 2018/0055288 A1 * | 3/2018 | Rose | G01N 33/14 |

(Continued)

FOREIGN PATENT DOCUMENTS

| | | | | |
|---|---|---|---|---|
| DE | 102016106597 A1 * | 9/2016 | | A47J 42/02 |
| WO | WO-2004037057 A1 * | 5/2004 | | A47J 42/04 |

OTHER PUBLICATIONS

English translate (WO2004037057A1), retrieved date Oct. 20, 2023.*

(Continued)

*Primary Examiner* — Matthew Katcoff
*Assistant Examiner* — Mohammed S. Alawadi
(74) *Attorney, Agent, or Firm* — Cramer Patent & Design PLLC; Aaron R. Cramer (57) ABSTRACT

A foodstuff grinding device is a portable grinding apparatus for coffee beans, herbs, spices, marijuana, and the like. The device takes a form of a cylindrical shape. The bottom portion of the device includes a rechargeable battery that operates an internal electric motor via a control switch. The upper portion of the invention includes a compartment with lid that holds the material to be ground. The bottom of this compartment is provided with multi-blade grinding mechanism that is operated by the motor. In the instance where coffee beans are ground, the top of the unit mates with a Keurig® K-cup reusable coffee filters to allow for easy refilling of such devices. It is also provided with a clip to attach to the side of most Keurig® models.

20 Claims, 9 Drawing Sheets

(56) References Cited

U.S. PATENT DOCUMENTS

2022/0175189 A1\* 6/2022 Davidson ................ A47J 42/04
2023/0255404 A1\* 8/2023 Tang ....................... A47J 42/08
                                                                                                        241/169.1

OTHER PUBLICATIONS

English translate (DE102016106597A1), retrieved date Oct. 20, 2023.\*

\* cited by examiner

FOODSTUFF GRINDING DEVICE

RELATED APPLICATIONS

The present invention is a continuation-in-part of U.S. Provisional Application No. 63/244,771 filed on Sep. 16, 2021, the entire disclosures of which are incorporated herein by reference.

FIELD OF THE INVENTION

The present invention relates to a foodstuff grinding device and a method to dispense ground foodstuff.

BACKGROUND OF THE INVENTION

Coffee is perhaps the most common hot beverage enjoyed by most everyone in the world today. Many people cannot start their day without a cup of their favorite coffee. Recently, many people have turned to Keurig® machines for their coffee at home and at work.

While no one will doubt the ability of such machines to quickly produce a perfect cup of coffee, such usage does have a few disadvantages. First, the individual cost per cup is somewhat high compared to other methods of home-based coffee preparation. Second, a user's favorite type, blend, or make of coffee may not be available in K-cup design. Finally, the used K-cup adds to the refuse or recycling waste stream. To address these problems, the market has responded with reusable and refillable K-cup filters. However, the ability to fill such small cups with freshly ground coffee beans is difficult and time consuming, thus negating the benefits of the Keurig® machines. Accordingly, there exists a need for a means by which coffee beans can be easily ground for a reusable K-cup filter and also serve other grinding needs. The development of the grinding device fulfills this need.

SUMMARY OF THE INVENTION

The principles of the present invention provide for a foodstuff grinding device having a main grinding body producing a plurality of ground foodstuffs from a plurality of unground foodstuffs, a hopper in environmental communication with a first conical section on an interior of the main grinding body for directing the unground foodstuffs towards a grind adjustment mechanism, a first container attachment removably attached to the main grinding body, a second conical section residing within the first container attachment, the second conical section extends downwardly from a first container top end, a second container attachment removably attached to the main grinding body, a lid attached to a main body top end of the main grinding body, a first fastener disposed on the perimeter of the main body top end, a second fastener disposed on the perimeter of a main body bottom end, a third fastener disposed on the perimeter of the first container top end that complementary mates with the second fastener of the main body bottom end, a fourth fastener disposed about the perimeter of the second container top end, the fourth fastener is complementary mating with the second fastener of the main body bottom end, a fifth fastener attaching the lid to the main body top end of the main grinding body, a support base located within the first containment attachment and resides on or adjacent the inner wall of a first container bottom end, a first container sidewall opening inserting and removing a fillable container, the first container sidewall opening terminates at the support base having a pair of side walls upwardly extending from the first container bottom end, the support base includes a circumferential groove to support a rim of a fillable container, and a second container sidewall extending downwardly from the second container top end and decreases in diameter to terminate at the second container bottom end.

The main grinding body may include a generally conical shape with an open main body top end, an open main body bottom end, and a continuous main body sidewall. The main grinding body may be provided with a charging port for recharging of an internal lithium-ion rechargeable battery. A plurality of additional internal wiring may then be used to connect the internal lithium-ion rechargeable battery to contact switch in a series connection to energize a pair of offset motors. The foodstuff grinding device may have a grind adjustment wheel and a power switch are disposed on the continuous main body sidewall to allow for adjustment of coarseness or fineness of the foodstuff discharge from the main grinding body.

The unground foodstuffs may be directed downward through the first conical section to a burr grinder having an inner grinding surface and an outer grinding surface. The outer grinding surface may be rotated by the pair of offset motors located on opposite sides of each other. The pair of offset motors may operate the outer grinding surface via a pair of gears and a gear ring along a rotational travel path. The grind adjustment mechanism may be connected to both the inner grinding surface and the grind adjustment to allow for coarseness/fineness adjustment as aforementioned described. The first container attachment may include a generally conical shape with an open first container top end, a closed first container bottom end, and a continuous first container sidewall.

A first container top end of the first container attachment may be attached to the main body bottom end of the main grinding body. The second container attachment may directly dispense the ground foodstuffs. A second container top end of the second container attachment may be attached to the main body bottom end of the main grinding body. The first fastener, the second fastener, the third fastener, the fourth fastener, and the fifth fastener may each have a twist lock connection. The first container attachment may be configured for filling and supporting a refillable container.

The support base may incorporate a means for supporting the refillable container in an upright position so that an open end thereof is in environmental communication with the second conical section. There may also be a removable first container bottom end for facilitating removal of the refillable container. The second conical section may direct the ground foodstuffs towards the refillable container. The second container attachment may be made of transparent material. The second container bottom end may have a generally oval shape.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 foodstuff grinding device
15 main grinding body
16 main body top end
17 main body bottom end
18 main body sidewall
20 first container attachment
21 first container top end
22 first container bottom end
23 first container sidewall
24 first container sidewall opening
25 second container attachment
26 second container top end
27 second container bottom end
28 second container sidewall
30 lid
31 lid body
35a first fastener
35b second fastener
36 third fastener
37 fourth fastener
38 fifth fastener
40 first conical intake section
41 second conical intake section
45 charging port
50 battery
55 grind adjustment wheel
60 hopper
65 unground foodstuffs
75 burr grinder
80 inner grinding surface
85 outer grinding surface
90 offset motor
95 gear
100 gear ring
105 vertical travel path "a"
110 circular gap
115 grind adjustment mechanism
120 contact switch
121 power switch
125 rotational travel path "r"
130 charge control circuit
135 internal wiring
140 ground foodstuffs
145 fillable container
150 support base
151 groove
155 discharge area

DESCRIPTION OF THE PREFERRED EMBODIMENT

The best mode for carrying out the invention is presented in terms of its preferred embodiment, herein depicted within FIGS. 1 through 13. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
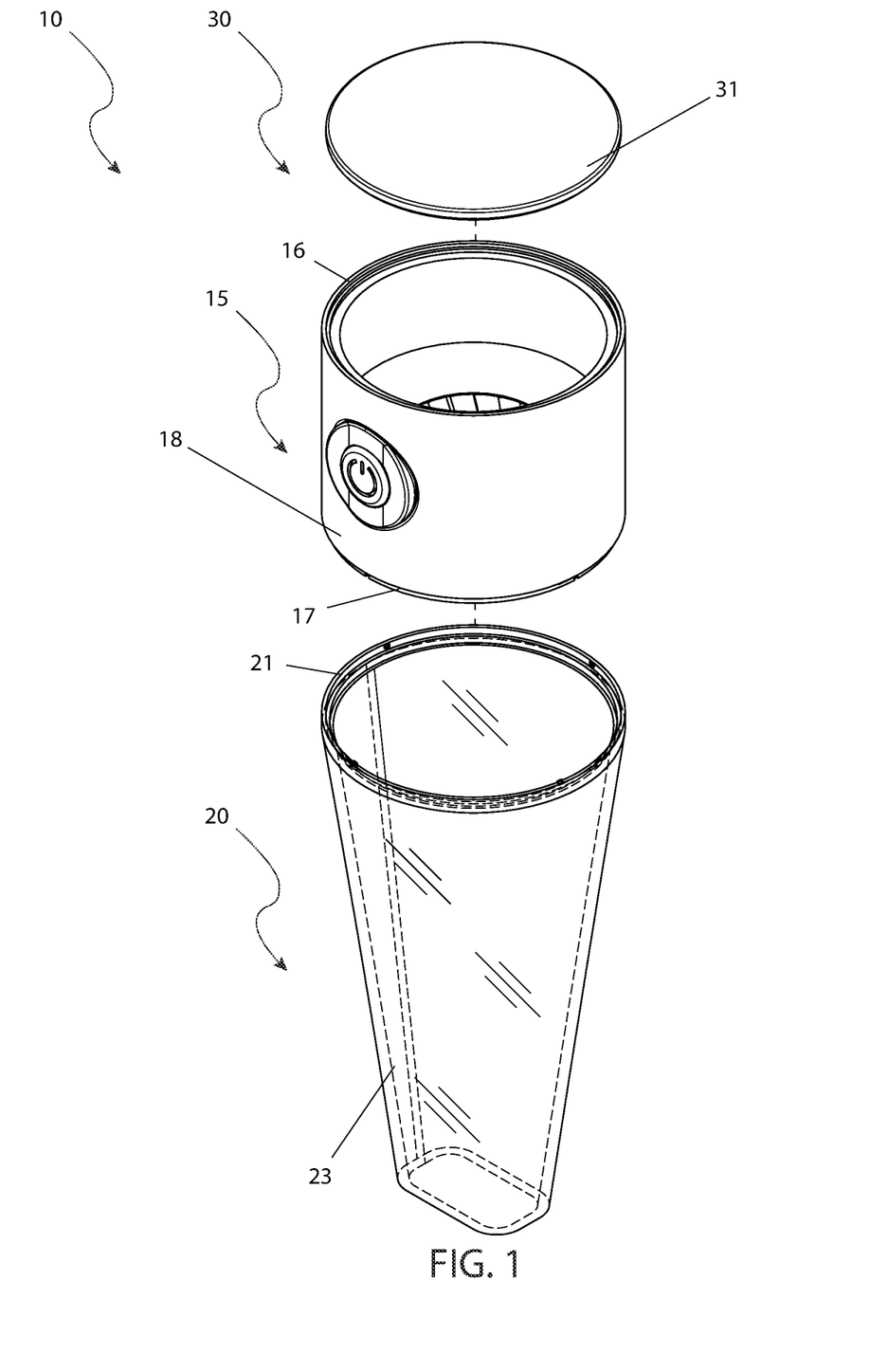
FIG. 1 is an exploded perspective drawing of the foodstuff grinding device, according to an embodiment of the present invention.
Figure 2:
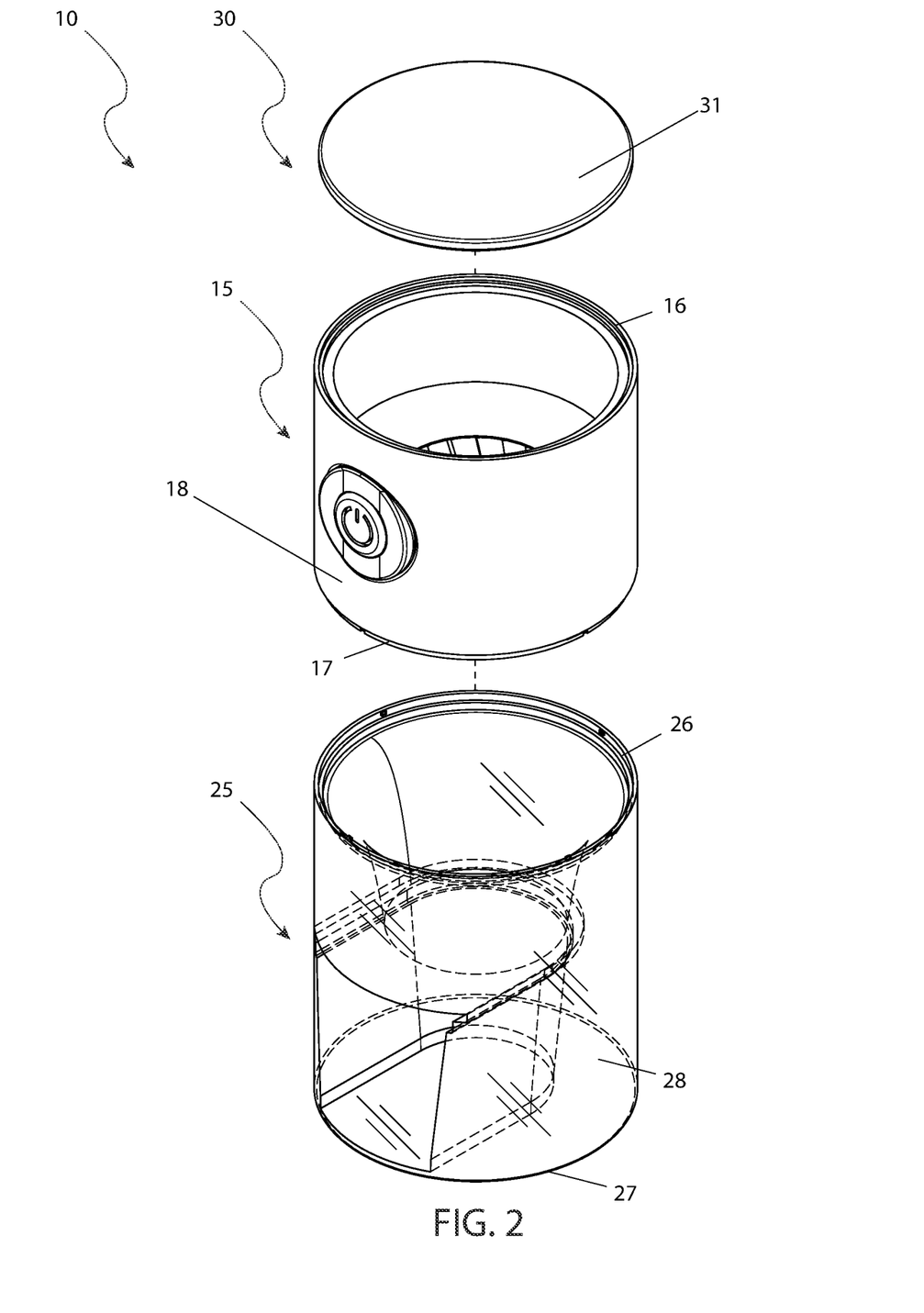
FIG. 2 is an exploded perspective drawing of the foodstuff grinding device, according to another embodiment of the present invention.

Referring now to FIG. 1, an overall exploded perspective drawing of the foodstuff grinding device 10, according to the preferred embodiment of the present invention is disclosed. The foodstuff grinding device (herein also described as the "device") 10, is designed to grind unground foodstuffs 65 into ground foodstuffs 140, particularly such as but not limited to coffee beans or spices. The device 10 includes three (3) main components; a main grinding body 15, a first container attachment 20 capable of removable attachment to the main grinding body 15, and a second container attachment 25 also capable of removable attachment to the main grinding body 15. The main grinding body 15 produces ground foodstuffs 140 from unground foodstuffs 65. The first container attachment 20 is configured for filling and supporting a fillable container 145. The second container attachment 25 is particularly suited for direct dispensation of the ground foodstuffs 140. A lid is also provided. FIG. 1 illustrates the foodstuff grinding device 10 where the lid 31 is attachable to a main body top end 16 of the main grinding body 15, and a first container top end 21 of the first container attachment 20 is capable of attachment to the main body bottom end 17 of the main grinding body 15. FIG. 2 illustrates the foodstuff grinding device 10 where the lid 31 is attachable to a main body top end 16 of the main grinding body 15, and a second container top end 26 of the second container attachment 25 is capable of attachment to the main body bottom end 17 of the main grinding body 15.

Figure 3:
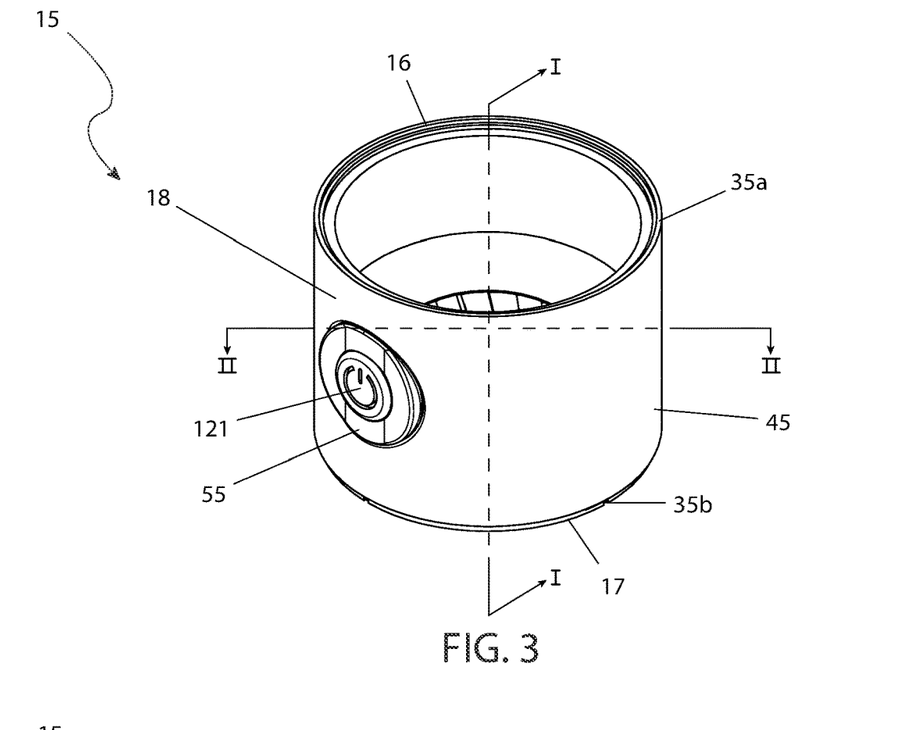
FIG. 3 is a top perspective view of a main grinding body, according to a preferred embodiment of the present invention.
Figure 4:
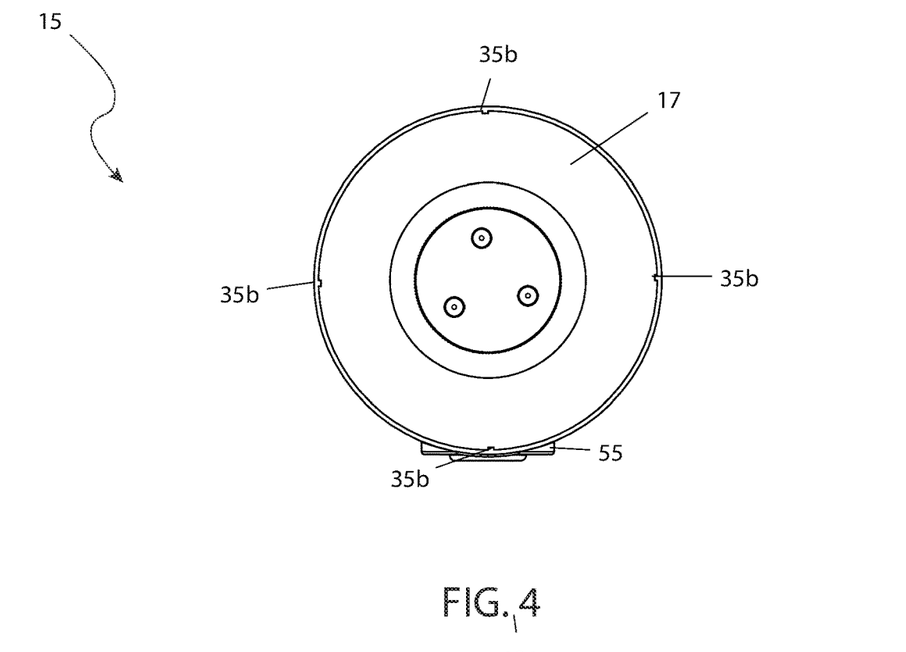
FIG. 4 is a bottom plan view of the main grinding body, according to a preferred embodiment of the present invention.

Referring now to FIGS. 3 and 4, the main grinding body 15 includes a generally cylindrical shape with an open main body top end 16, an open main body bottom end 17, and a continuous main body sidewall 18. The approximate diameter of the main grinding body 15 will be one-hundred-twenty millimeters (120 mm). Located about the perimeter of the main body top end 16 is a first fastener 35a. Similarly located about the perimeter of the main body bottom end 17 is a second fastener 35b. The main grinding body 15 is provided with a hopper 60 in environmental communication with a first conical intake section 40 on an interior thereof for directing of unground foodstuffs 65 towards the grinding mechanism (please see FIGS. 10 and 11). The main grinding body 15 is provided with a charging port 45 for recharging of an internal lithium-ion rechargeable battery 50 (please see FIGS. 10 and 11). Further information on the rechargeable battery 50 will be provided herein below. A grind adjustment wheel 55 and a power switch 121 are provided on the main body sidewall 18 to allow for adjustment of the coarseness or fineness of the foodstuff discharge from the main grinding body 15. Further information on the operation of the grind adjustment wheel 55 will be provided herein below.

Figure 5:
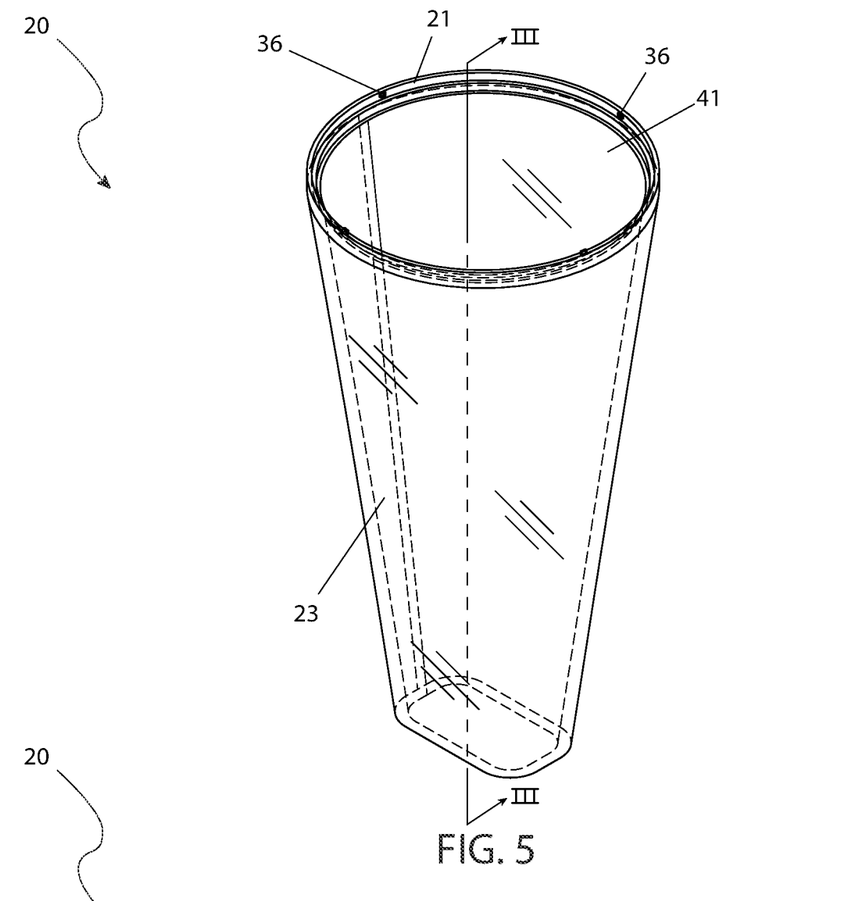
FIG. 5 is a top perspective view of a first container attachment, according to a preferred embodiment of the present invention.
Figure 6:
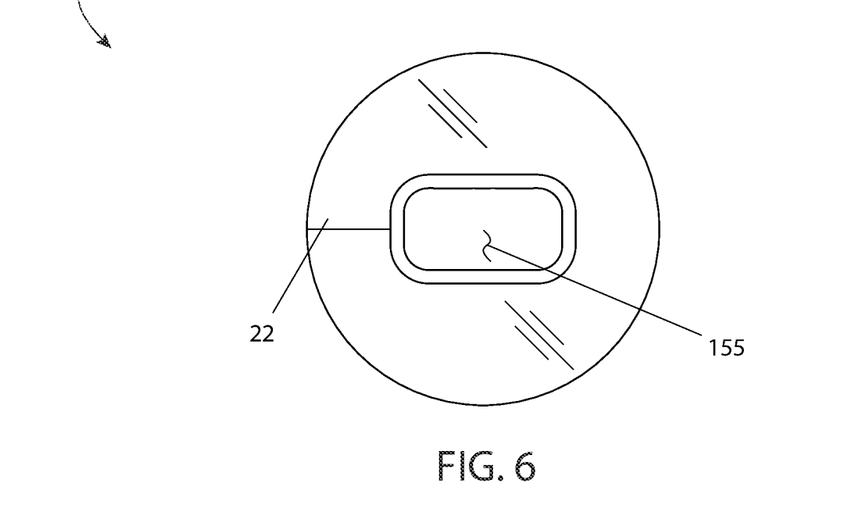
FIG. 6 is a bottom plan view of the first container attachment, according to a preferred embodiment of the present invention.

Referring now to FIGS. 5 and 6, the first container attachment 20 includes a generally cylindrical shape with an open first container top end 21, a closed first container bottom end 22, and a continuous first container sidewall 23. The approximate diameter of the first container attachment 20 will be one-hundred-twenty millimeters (120 mm), preferably configured so that when coupled, the lid 30, main grinding body 15, and first container attachment 20 have a continuous outer diameter and an overall smooth and uninterrupted appearance. Located about the perimeter of the first container top end 21 is a third fastener 36 capable of complementary mating with the second fastener 35b of the main body bottom end 17. The preferred configuration of the second fastener 35b and third fastener 36 is a twist lock connection 35.

A second conical section 41 resides within the interior of the first container attachment 20 and extends downwardly from the first container top end 21. A first container sidewall opening 24, sized and capable of insertion and removal of a fillable container 145, terminates in a support base 150 having side walls and upwardly extending from the first container bottom end 22. The support base 150 incorporates a circumferential groove 151 to support a rim of a fillable container 145 in an upright position so that an open end thereof is in environmental communication with the second conical section 41. Other embodiments may provide for a removable first container bottom end 22 for facilitating removal of the fillable container 145. The second conical intake section 41 directs ground foodstuffs 140 towards the fillable container 145 (please see FIG. 12).

Figure 7:
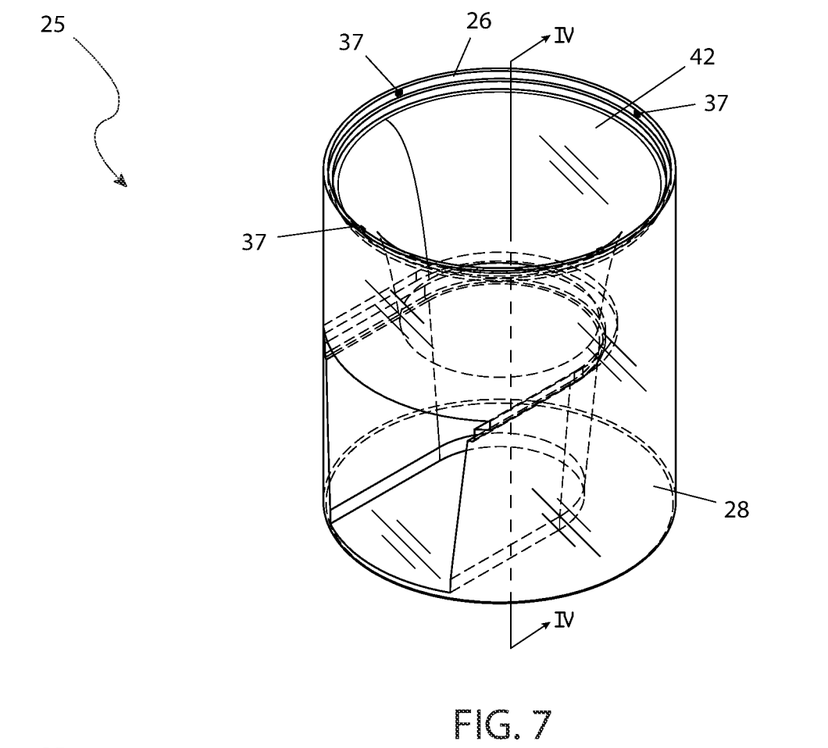
FIG. 7 is a top perspective view of a second container attachment, according to a preferred embodiment of the present invention.
Figure 8:
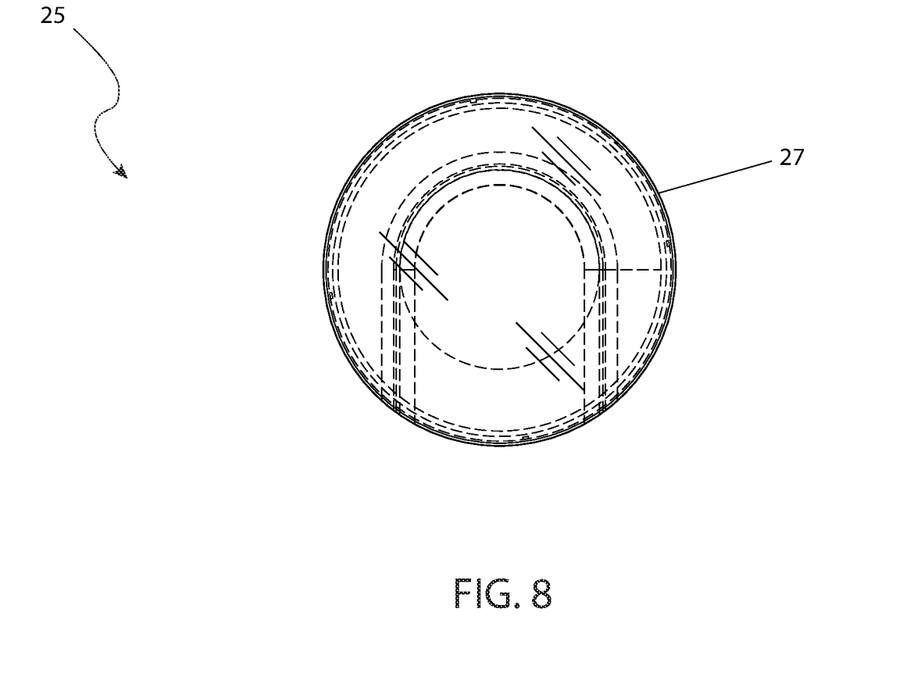
FIG. 8 is a bottom plan view of the second container attachment, according to a preferred embodiment of the present invention.

Referring now to FIGS. 7 and 8, the second container attachment 25 includes a generally conical shape with an open second container top end 26, an open second container bottom end 27, and a continuous second container sidewall 28. The approximate diameter of the second container attachment 25 at the second container top end 26 will be one-hundred-twenty millimeters (120 mm), preferably configured so that when coupled, the lid 30, main grinding body 15, and second container top end 26 have a continuous outer diameter and an overall smooth and uninterrupted appearance. Located about the perimeter of the second container top end 26 is a fourth fastener 37 capable of complementary mating with the second fastener 35b of the main body bottom end 17. The preferred configuration of the second fastener 35b and fourth fastener 37 is a twist lock connection 35.

The second container sidewall 28 extends downwardly from the second container top end 26 and decreases in diameter to terminate at the second container bottom end 27. In certain embodiments, the second container bottom end 27 has a generally oval shape. –A discharge area 155 terminates in an opening formed on the wall of the second container bottom end 27. The discharge area 155 dispenses ground foodstuffs 140 to the environment as desired by the user.

Figure 9:
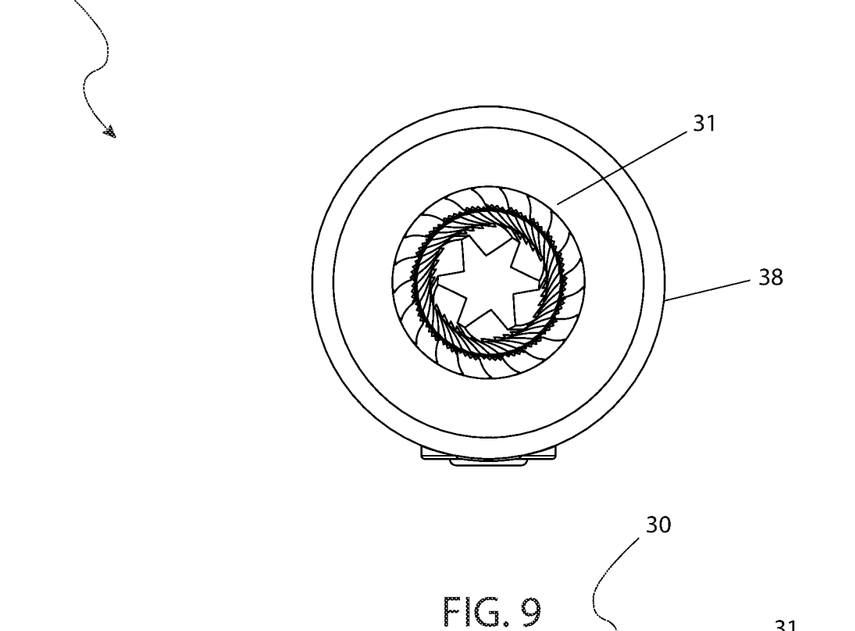
FIG. 9 is a top perspective view of a lid, according to a preferred embodiment of the present invention.

Referring now more closely to FIG. 9, the lid 30 comprises a cylindrical lid body 31 that is capable of removable attachment to the first fastener 35a at the main body top end 16 of the main grinding body 15 by a fifth fastener 38. The preferred configuration of the first fastener 35a and fifth fastener 38 is a twist lock connection 35. The lid body 31 therefore preferably has an outer diameter that enables this connection and provide an overall smooth and uninterrupted appearance.

Figure 10:
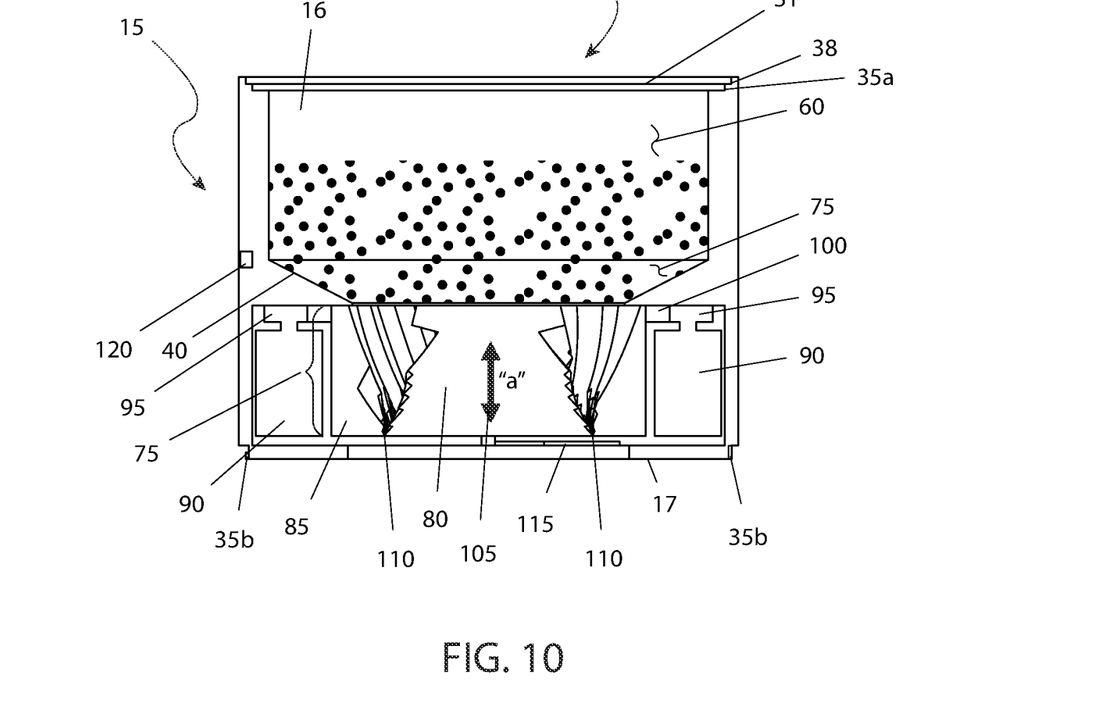
FIG. 10 is a sectional view of the main grinding body, as seen along a Line I-I, as shown in FIGS. 1 and 3, according to the preferred embodiment of the present invention.

Referring next to FIG. 10, a sectional view of the main grinding body 15, as seen along a Line I-I, as shown in FIG. 3, according to the preferred embodiment of the present invention is depicted. This figure discloses the lid 30 attached to the main grinding body 15 via the first fastener 35a and fifth fastener 38. The upper portion of the interior of the main grinding body 15 is provided with a hopper 60 that holds unground foodstuffs 65, such as coffee beans, spices, or the like. The unground foodstuffs 65 are directed downward through the first conical intake section 40 to a burr grinder 75 having an inner grinding surface 80 and an outer grinding surface 85. The burr grinder 75 is envisioned to be provided with physical properties as follows:

Weight: point-five-one-seven kilograms (0.517 Kg)
Outside Diameter: sixty-eight millimeters (68 mm)/two and seven-tenths inches (2.7 in.)
Turning Direction: Clockwise
Inside Diameter: forty-five millimeters (45 mm)/one and eight-tenths inches (1.8 in.)
External diameter sixty-eight-forty-ninths of a millimeter (68/49 mm)—Internal diameter forty-five-thirteenths millimeters (45/13 mm)
Thickness twenty-five millimeters (25 mm)—four (4) Fixing Holes
Inner Groove for Feather The outer grinding surface 85 is rotated by two (2) offset motors 90 located on opposite sides. The offset motors 90 each operate a gear 95 which rotate a gear ring 100 on the top of the outer grinding surface 85. The outer grinding surface 85 remains stationary in respect to rotational direction but does move along a vertical travel path "a" 105 to produce different coarseness of grinding output. At a lowermost position, a circular gap 110 is relatively larger produce relatively larger or coarser grinding output, while at an uppermost position, the circular gap 110 is relatively smaller producing a smaller or finer grinding output. The vertical travel path "a" 105 is controlled by a grind adjustment mechanism 115 which is connected to the grind adjustment wheel 55 (as shown in FIG. 1). A contact switch 120, which is physically activated by 121 power switch, allows for activation of the offset motors 90. As the lid 30 must be installed, thus covering all moving parts, the contact switch 120 ensures an inherently safe operation.

Figure 11:
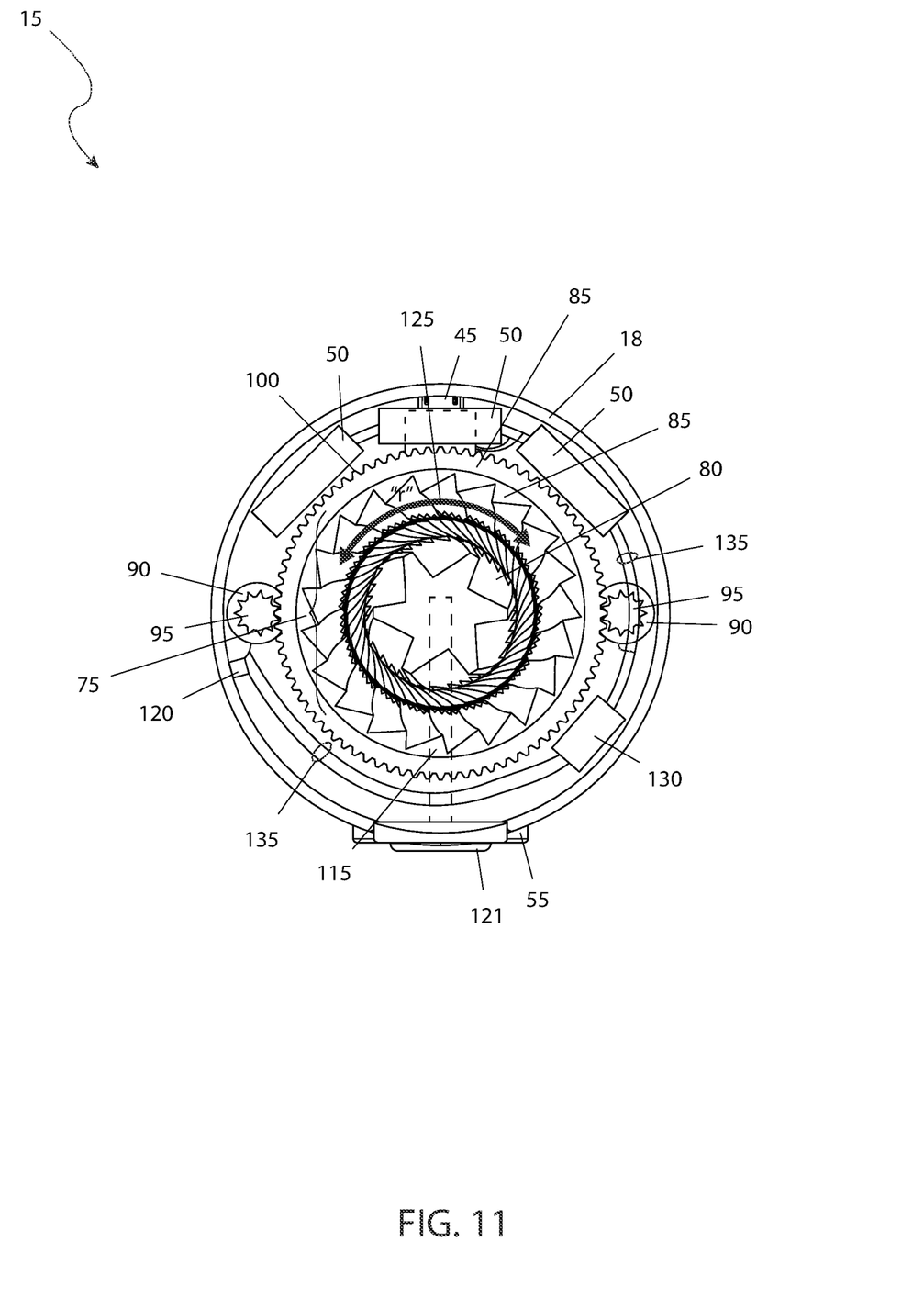
FIG. 11 is a sectional view of the main grinding body, as seen along a Line II-II, as shown in FIG. 3, according to the preferred embodiment of the present invention.

Referring now to FIG. 11, a sectional view of the main grinding body 15, as seen along a Line II-II, as shown in FIG. 3, according to the preferred embodiment of the present invention is shown. This view discloses the burr grinder 75 with the inner grinding surface 80 and the outer grinding surface 85 within the main grinding body 15. The offset motors 90 operate the outer grinding surface 85 via the two (2) gears 95 and the gear ring 100 along a rotational travel path "r" 125. The charging port 45 is connected to a charge control circuit 130 which recharges the rechargeable battery 50 via internal wiring 135. Additional internal wiring 135 is then used to connect the rechargeable battery 50 to the contact switch 120 in a series connection. The output from the contact switch 120 is then used to activate the power switch 121 to energize the offset motors 90 in a parallel circuit connection via additional internal wiring 135. Finally, the grind adjustment mechanism 115, herein shown via dashed lines due to its hidden connection is connect to both the inner grinding surface 80 and the grind adjustment wheel 55 to allow for coarseness/fineness adjustment as aforementioned described.

Figure 12:
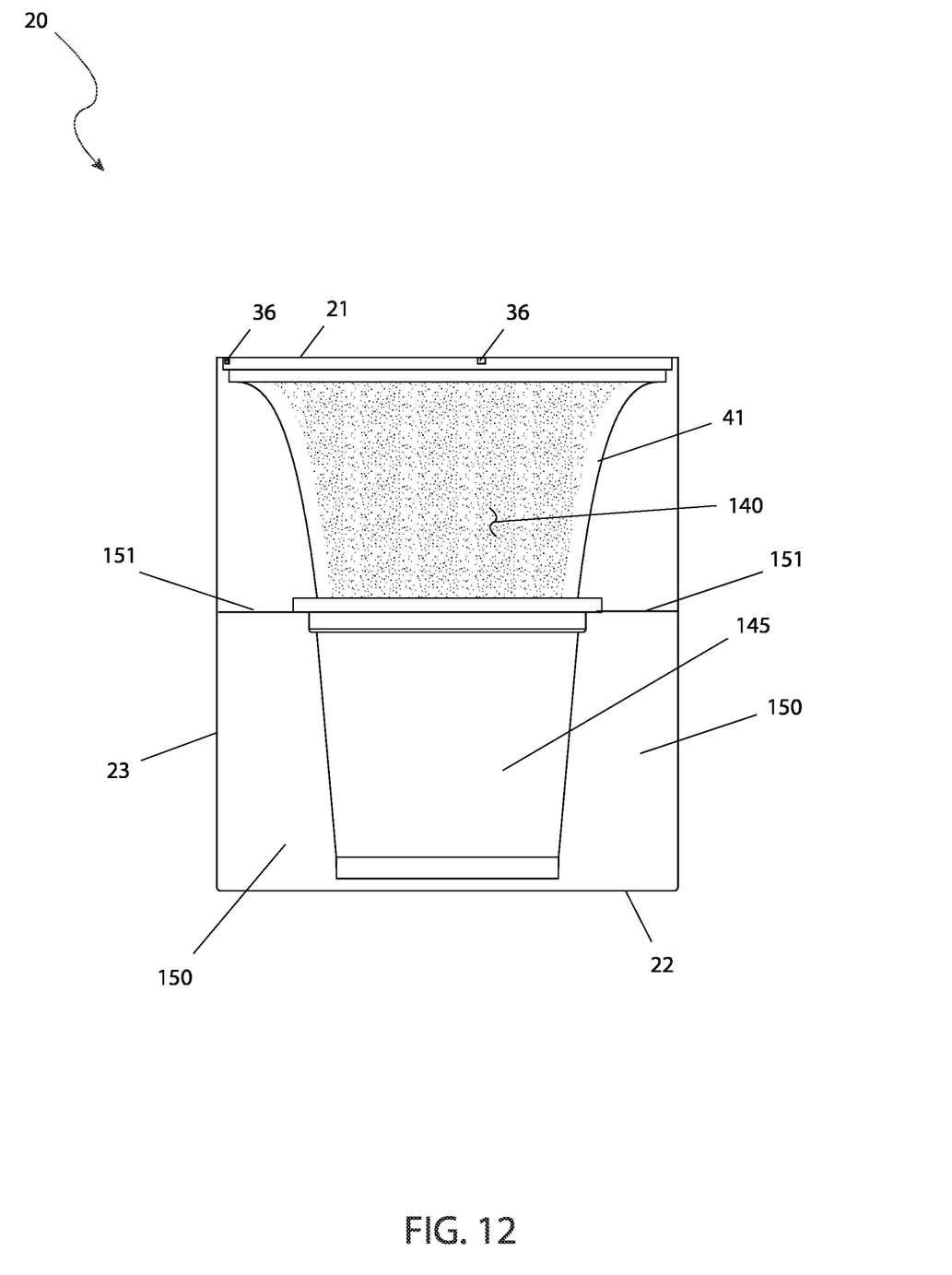
FIG. 12 is a sectional view of the first container attachment, as seen along a Line III-III, as shown in FIG. 5, according to the preferred embodiment of the present invention; and, FIG. 13 is a sectional view of the second container attachment, as seen along a Line IV-IV, as shown in FIG. 7, according to the preferred embodiment of the present invention.

Referring next to FIG. 12, a sectional view of the first container attachment 20, as seen along a Line III-III, as shown in FIG. 5, according to the preferred embodiment of the present invention is disclosed. As ground foodstuffs 140 exit the burr grinder 75 (as shown in FIG. 10), they are routed through the second conical intake section 41 into a fillable container 145. The fillable container 145 is envisioned to be pre-loaded within the grooves 151 of the support base 150 via the first container sidewall opening 24 that resides in the bottom of the first container attachment 20 such that the interior thereof is in environmental communication with the second conical intake section 41. The second conical intake section 41 may or may not be removable to facilitate placement and removal of the fillable container 145 within the support base 150.

Figure 13:
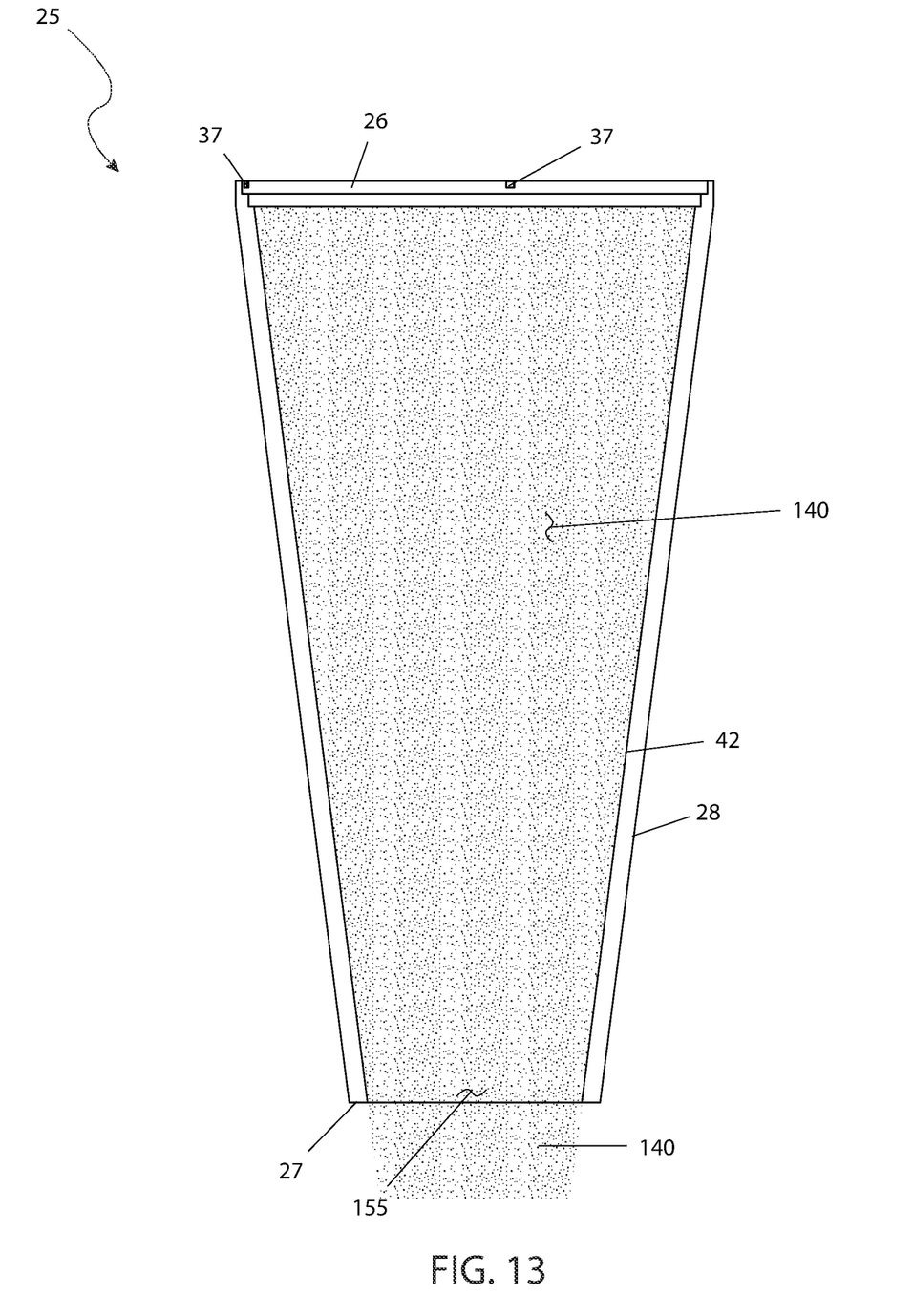

Referring to FIG. 13, a sectional view of the second container attachment 25, as seen along a Line IV-IV, as shown in FIG. 7, according to the preferred embodiment of the present invention is depicted. It is envisioned that both the second container attachment 25 is manufactured from a clear material such as Lexan® with an overall height of approximately six to eight inches (6-8 in.). The second container sidewall 28 terminates in a discharge area 155 and located at the second container bottom end 27. The coupling of the fourth fastener 37 to the second fastener 35b (thereby coupling the second container attachment 25 to the main grinding body 15) facilitates pouring ground foodstuffs 140 in a more concentrated manner while being held in one's hand. The ground foodstuffs 140 will exit from the discharge area 155 providing more control of the dispensing of the ground foodstuffs 140 placement, such as that would be used for grinding coffee for a bulk coffee maker, or for ground spices such as salt, pepper, or the like.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as home good stores, discount stores, department stores, mail order and internet supply houses and the like.

After procurement and prior to utilization, the device 10 would be prepared in the following manner: the user would connect a suitable power source to the charging port 45 to fully charge the rechargeable battery 50 through the charge control circuit 130; if the device 10 is desired to be used in the embodiment illustrated within FIG. 1, a fillable container 145 would be inserted into the support base 150 of the first container attachment 20; the first container attachment 20 would then be attached to the main grinding body 15 via the third fastener 36 to the second fastener 35b; unground foodstuffs 65 would be placed into the hopper 60 of the main griding body 15; and the lid 30 is secured to the main grinding body 15 via coupling the fifth fastener 38 to the first fastener 35a. At this point in time, the device 10 is ready for use. If the device 10 is desired to be used in the embodiment illustrated within FIG. 2, the second container attachment 25 would be attached to the main grinding body 15 via the fourth fastener 37 to the second fastener 35b; unground foodstuffs 65 would be placed into the hopper 60 of the main griding body 15; and the lid 30 is secured to the main grinding body 15 via coupling the fifth fastener 38 to the first fastener 35a. At this point in time, the device 10 is ready for use.

During utilization of the device 10, the user would press down on the lid 30, thus activating the contact switch 120 to enable use of the power switch 121 and energizing the burr grinder 75 in order to produce ground foodstuffs 140 from unground foodstuffs 65. After an appropriate period of operational time due to the desired properties of the ground foodstuffs 140, the power switch 121 can be no longer activated and the lid 30 is released thus resulting in the device 10 ceasing grinding operations. In the case of using the first container attachment 20, the fillable container 145 is removed from the support base 150 and subsequently used as desired. In the case of using the second container attachment 25, the ground foodstuffs 140, envisioned to be coffee, tea leaves, marijuana, tobacco products, herbs, spices, and the like, are discharged from the discharge area 155 as needed for the particular task.

After use of the device 10, the lid 30 and either the first container attachment 20 or the second container attachment 25 is separated from the main grinding body 15. The hopper 60, the burr grinder 75, and the appropriate conical intake sections 40, 41 is removed and the various components of the device 10 washed and rinsed. At this point in time, the device 10 is ready for reassembly, recharging and continued use in a cyclical manner as aforementioned described. In an exemplary embodiment, either or both a portion or all of the first container attachment 20 and second container attachment 25 can be transparent so the contents are easily visible.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A foodstuff grinding device, comprising:
   a main grinding body producing a plurality of ground foodstuffs from a plurality of unground foodstuffs;
   a hopper in environmental communication with a first conical section on an interior of the main grinding body for directing the unground foodstuffs towards a grind adjustment mechanism;

a first container attachment removably attached to the main grinding body;

a second conical section residing within the first container attachment, the second conical section extends downwardly from a first container top end;

a second container attachment removably attached to the main grinding body;

a lid attached to a main body top end of the main grinding body;

a first fastener disposed on the perimeter of the main body top end;

a second fastener disposed on the perimeter of a main body bottom end;

a third fastener disposed on the perimeter of the first container top end that complementary mates with the second fastener of the main body bottom end;

a fourth fastener disposed about the perimeter of the second container top end, the fourth fastener is complementary mating with the second fastener of the main body bottom end;

a fifth fastener attaching the lid to the main body top end of the main grinding body;

a support base located within the first container attachment and resides on or adjacent the inner wall of a first container bottom end;

wherein the first container attachment having a first container sidewall opening for inserting and removing a refillable container, the first container sidewall opening terminates at the support base having a pair of side walls upwardly extending from the first container bottom end, the support base includes a circumferential groove to support a rim of the refillable container; and a second container sidewall extending downwardly from a second container top end and decreases in diameter to terminate at a second container bottom end.

2. The foodstuff grinding device, according to claim 1, wherein the main grinding body includes a generally conical shape with an open main body top end, an open main body bottom end, and a continuous main body sidewall.

3. The foodstuff grinding device, according to claim 2, wherein the main grinding body is provided with a charging port for recharging of an internal lithium-ion rechargeable battery.

4. The foodstuff grinding device, according to claim 3, wherein a plurality of internal wiring is then used to connect the internal lithium-ion rechargeable battery to contact switch in a series connection to energize a pair of offset motors.

5. The foodstuff grinding device, according to claim 2, further comprising a grind adjustment wheel and a power switch are disposed on the continuous main body sidewall to allow for adjustment of coarseness or fineness of the foodstuff discharge from the main grinding body.

6. The foodstuff grinding device, according to claim 1, wherein the unground foodstuffs are directed downward through the first conical section to a burr grinder having an inner grinding surface and an outer grinding surface.

7. The foodstuff grinding device, according to claim 6, wherein the outer grinding surface is rotated by the pair of offset motors located on opposite sides of each other.

8. The foodstuff grinding device, according to claim 7, wherein the pair of offset motors operate the outer grinding surface via a pair of gears and a gear ring along a rotational travel path.

9. The foodstuff grinding device, according to claim 6, wherein the grind adjustment mechanism is connected to both the inner grinding surface and the grind adjustment to allow for coarseness/fineness adjustment.

10. The foodstuff grinding device, according to claim 1, wherein the first container attachment includes a generally conical shape with an open first container top end, a closed first container bottom end, and a continuous first container sidewall.

11. The foodstuff grinding device, according to claim 1, wherein a first container top end of the first container attachment is attached to the main body bottom end of the main grinding body.

12. The foodstuff grinding device, according to claim 1, wherein the second container attachment directly dispenses the ground foodstuffs.

13. The foodstuff grinding device, according to claim 1, wherein a second container top end of the second container attachment is attached to the main body bottom end of the main grinding body.

14. The foodstuff grinding device, according to claim 1, wherein the first fastener, the second fastener, the third fastener, the fourth fastener, and the fifth fastener are each a twist lock connection.

15. The foodstuff grinding device, according to claim 1, wherein the first container attachment is configured for filling and supporting the refillable container.

16. The foodstuff grinding device, according to claim 15, wherein the support base incorporates a means for supporting the refillable container in an upright position so that an open end thereof is in environmental communication with the second conical section.

17. The foodstuff grinding device, according to claim 16, further comprising a removable first container bottom end for facilitating removal of the refillable container.

18. The foodstuff grinding device, according to claim 16, wherein the second conical section directs the ground foodstuffs towards the refillable container.

19. The foodstuff grinding device, according to claim 1, wherein the second container attachment is made of transparent material.

20. The foodstuff grinding device, according to claim 1, wherein the second container bottom end has a generally oval shape.

* * * * *